US010823358B1

(12) United States Patent
Stein et al.

(10) Patent No.: US 10,823,358 B1
(45) Date of Patent: Nov. 3, 2020

(54) DEVICE AND METHOD OF DIRECTING A LIGHT VIA ROTATING PRISMS

(71) Applicant: Valeo Vision SAS, Bobigny (FR)

(72) Inventors: Gregory Stein, Seymour, IN (US); Brant Potter, Seymour, IN (US)

(73) Assignee: Valeo Vision, Bobigny (FR)

(*) Notice: Subject to any disclaimer, the term of this patent is extended or adjusted under 35 U.S.C. 154(b) by 0 days.

(21) Appl. No.: 16/721,115

(22) Filed: Dec. 19, 2019

(51) Int. Cl.

| | |
|---|---|
| ***F21S 41/36*** | (2018.01) |
| ***B60Q 1/04*** | (2006.01) |
| ***F21S 41/141*** | (2018.01) |
| ***F21V 5/00*** | (2018.01) |
| ***F21S 41/63*** | (2018.01) |

(52) U.S. Cl.
CPC ................ *F21S 41/36* (2018.01); *B60Q 1/04* (2013.01); *F21S 41/141* (2018.01); *F21S 41/635* (2018.01); *F21V 5/008* (2013.01); *B60Q 2400/50* (2013.01)

(58) Field of Classification Search
CPC ........ F21S 41/36; F21S 41/141; F21S 41/635; F21V 5/008; B60Q 2400/50
See application file for complete search history.

(56) References Cited

U.S. PATENT DOCUMENTS 4,823,243 A * 4/1989 Weigert .................... F21S 8/00 362/281
7,241,034 B2 7/2007 Smith et al.
9,481,287 B2 11/2016 Marti et al.
9,925,914 B2 3/2018 Schlaug et al.
10,043,395 B2 8/2018 Morel et al.
2004/0218401 A1* 11/2004 Okubo ..................... B60Q 1/10 362/526
2011/0210667 A1 9/2011 Shiao et al.
2012/0044090 A1 2/2012 Kahler et al.
2012/0053795 A1 3/2012 Bos et al.
2013/0027783 A1* 1/2013 Greiner ................. F41G 7/2253 359/648
2013/0101276 A1* 4/2013 Keller .................. G02B 27/644 396/55
2015/0204504 A1* 7/2015 Suwa ...................... F21S 41/36 362/514
2015/0267888 A1* 9/2015 Suwa ......................... B62J 6/02 362/512
2016/0161076 A1* 6/2016 Shibata ................. F21S 41/148 362/509
2016/0377265 A1* 12/2016 Hansen ................... F21V 14/08 362/268
2017/0050555 A1* 2/2017 Chen ..................... F21S 41/675
2017/0146639 A1* 5/2017 Carothers ............. G01S 7/4817
2017/0246983 A1 8/2017 Canonne et al.
2017/0328533 A1* 11/2017 Ko .......................... F21S 41/17

(Continued)

*Primary Examiner* — Rajarshi Chakraborty
*Assistant Examiner* — Michael Chiang
(74) *Attorney, Agent, or Firm* — Young Basile Hanlon & MacFarlane, P.C.

(57) ABSTRACT

A light system comprising: (a) a light source that is configured to direct light from an exterior of a vehicle; and (b) two or more optical elements that direct the light to two or more desired locations without movement of the light source, the two or more optical elements being in series so that the light from the light source is directed through the two or more optical elements; and wherein the two or more desired locations include a driving surface and a location above the driving surface.

20 Claims, 7 Drawing Sheets

34 32 2 62 64 60

(56) References Cited

U.S. PATENT DOCUMENTS

| | | | |
|---|---|---|---|
| 2018/0056854 | A1 | 3/2018 | Kunii et al. |
| 2018/0224082 | A1 | 8/2018 | Reinprecht et al. |
| 2019/0337443 | A1 | 11/2019 | Epperlein et al. |

* cited by examiner

DEVICE AND METHOD OF DIRECTING A LIGHT VIA ROTATING PRISMS

FIELD

The present teachings relate a device and method of changing an angle of light generated by a light source while maintaining a position of the light source, and preferably angling a light source downward towards a road surface while maintaining the headlights in a static position.

BACKGROUND

Headlights in vehicles typically are static in position and once aimed maintain the aim. In order to illuminate a larger area the headlights are switched from a low beam to a high beam. Attempts have been made to adjust a region illuminated by a headlight by physically moving lights and directing the light from the lights to a desired region.

Examples of lights or light control systems may be disclosed in U.S. Pat. Nos. 10,043,395 and 9,481,287; US Publication Nos. 2017/0246983 and 2012/0044090 all of which are expressly incorporated herein by reference for all purposes. Thus, there is a need for a device that aims light from a light source without adjusting the light source itself. It would be desirable to method and device for directing a light source onto a road surface. There is a need for a device and method of changing a direction and angle of light source so that the light source can project words or images unto a road surface and be used as a headlight. It would be desirable to have a single light source that may have adjustable beam patterns that may be used to write on a road and illuminate objects in front of a vehicle.

SUMMARY

The present teachings provide: A light system comprising: (a) a light source that is configured to direct light from an exterior of a vehicle; and (b) two or more optical elements that direct the light to two or more desired locations without movement of the light source, the two or more optical elements being in series so that the light from the light source is directed through the two or more optical elements; and wherein the two or more desired locations include a driving surface and a location above the driving surface.

The present teachings provide: a method comprising: (a) directing light from a light source through two or more optical elements so that the light extends outward from an exterior of a vehicle; and (b) rotating one or more of the two or more optical elements so that the light is directed from a first location to a second location.

The present teachings provide a device that aims light from a light source without adjusting the light source itself. The present teachings provide a method and device for directing a light source onto a road surface. The present teachings provide a device and method of changing a direction and angle of light source so that the light source can project words or images unto a road surface and be used as a headlight. The present teachings provide a single light source that may have adjustable beam patterns that may be used to write on a road and illuminate objects in front of a vehicle.

DETAILED DESCRIPTION

Figure 1:
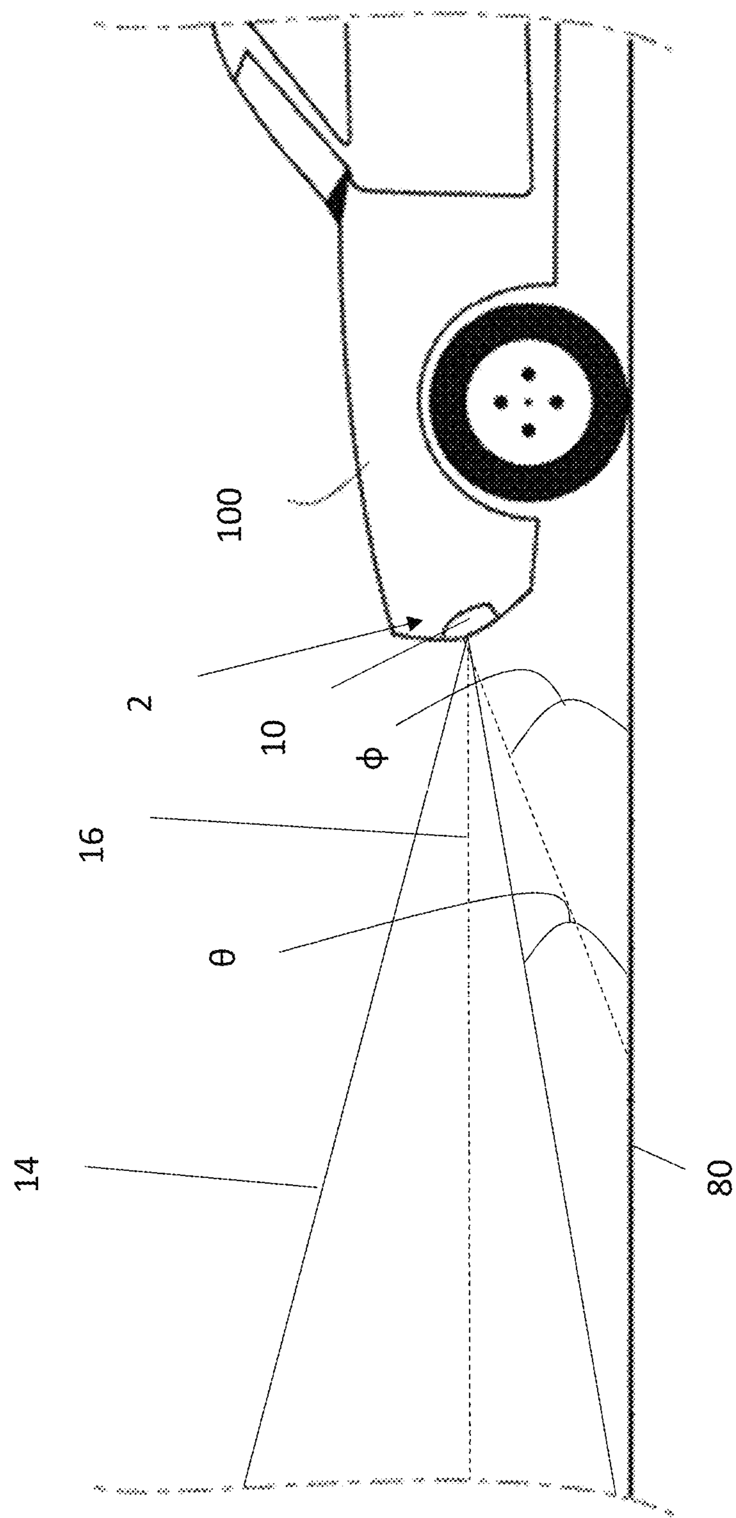
FIG. 1 is a side view of a vehicle with a light being moved between two positions.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located with a vehicle. Preferably, the light system is part of a car, motorcycle, bus, truck, semi-truck, SUV, XUV, four-wheeler, dirt bike, or a combination thereof. The light system may project in a forward direction, rear direction, side direction, or a combination thereof. Preferably, the light system projects a light from an external surface of the vehicle to a location in front of the vehicle. The light system may be integrated into a front end, a rear end, or both of a car. The light system may project light out of the vehicle. The light source may include lights and optical elements. The lights of the light system may be part of a light source.

The light source functions to produce light. The light source may be a device or plurality of devices that create light and the light extends outward from the light source. The light source may produce a high beam, a low beam, or both. The light source may be aimed for near field or far field. The light source may be any type of lighting device that produces light such as an incandescent bulb, fluorescent light, compact fluorescent lamp, halogen lamp, light emitting diode (LED), high intensity discharge lamps (HID); halogen lights, xenon lights, or a combination thereof. The light source may be a single lamp or bulb. Preferably, the light source includes a plurality of lamps, bulbs, diodes, or a combination thereof. The light source may be an array. The light source may include two or more, 5 or more, 10 or more, 20 or more, or even 50 or more devices that produce light and combine together to form the light source. The light source may include 500 or less, 300 or less, or 200 or less devices that produce light. For example, if the light source is a 10×10 array of light devices some of the 100 devices may be selectively turned on and off, dimmed, brightened, or a combination thereof to create patterns, images, words, text, numbers, shapes, or a combination thereof. The light source may be static. The light source may be free of movement. The light source may be fixed. The light source may be fixed and the light from the light source may be moved, bent, directed, or a combination thereof by optical elements. The light from the light source may be moved or aimed from near field to far field or vice versa. Near field may include a projection onto the ground or a road surface. A driver may control movement between near field and far field. The light system may automatically adjust between far field and near field. The images created by the light source may include a combination of words, shapes, numbers, patterns, or images. Each device that produces light may be independently controlled. Each device of the light source may be turned on and off. The color, intensity, shape, or a combination thereof of each device of the light source may be controlled or adjusted. For example, some devices may be turned red and other devices may remain white. The light source may direct light to a driving surface. For example, a center of the light may be located on the driving surface. The light source may direct light above a driving surface (e.g., some light may contact and illuminate the driving surface by a center of the light may be located above the driving surface). The light source may be directed substantially parallel to the light surface. For example, a center of the light, an axis of the light, or both may extend parallel to the driving surface. The light source may extend along an axis or may be directed away from the axis.

The axis may be an axis of the lights, rotational axis of the optical elements, rotational axis of prisms, or a combination thereof. The axis may extend from the light source and through the optical elements. The axis may be a center of the lights. The axis may extend parallel to a driving surface. The axis may be varied when the light is adjusted from a nominal mode (or position) to a writing mode (or position).

The nominal mode, nominal position, or both may be a position where the light extends over a driving surface, parallel to a driving surface, or both. The nominal mode or nominal position may be far field aiming. The nominal mode, nominal position, or both may be where the optical elements direct light along an axis, the rotational axis, or both. nominal mode, nominal position, or both. In the nominal mode, the light source may be directed straight in front of a vehicle. In the nominal position, an axis of the lights may be above a driving surface. The nominal mode or nominal position may be a center position or starting position of optical elements, light source, or both. The nominal mode or nominal position may be where light is directed to view objects a distance away (e.g., in front of a vehicle).

The writing mode, writing position, or both may function to direct light from a light source towards a driving surface. The writing mode, writing position, or both may angle the light from a light source downward. The writing mode or writing position may be near field aiming. The writing mode, writing position, or both may direct light towards a driving surface so that images (e.g., words, symbols, numbers, shapes) may be formed on the driving surface. The writing mode may be where the vehicle or a control system controls the light source to direct the light source to the driving surface or to form images with the light source. In the writing mode, writing position, or both one or more of the optical elements may be moved to change a direction of the light from the light source, to deflect the beam of light from the light source, or both.

The light functions to illuminate objects in a direction of movement of a vehicle, proximate to a vehicle, or both. The light functions to form images on a driving surface to communicate with one or more adjacent vehicle, drivers, pedestrians, bicyclists, or a combination thereof. The light may have a center or focal point. The light may be directed above a road surface. The light may be directed substantially parallel to the road surface (e.g., with an angle of about ±2 degrees of parallel). The light may be directed parallel to a road surface. The light may be directed onto the road surface (e.g., a center or focal point of the light is on the road surface). The light may be moved, adjusted, bent, or a combination thereof by optical elements.

The optical elements may function direct light from the light source to a desired location. The optical elements may move light from a light source towards or away from a driving surface. The optical elements may direct the light along an axis, a rotational axis, an axis of the light source, or a combination thereof. The optical elements may direct the light at an angle relative to an axis, a rotational axis, an axis of the light source, or a combination thereof. The optical elements may direct the light up, down, left, right, or a combination thereof relative to a direction of motion of a vehicle (e.g., forward or reverse). The light system may include two or more optical elements. The optical elements and the light source may be all part of one device. The optical elements and the light source may be located within a single bracket or single module. The optical elements may be added to a pre-existing system (e.g., may be attached aftermarket). The light system may include three or more, four or more, or five or more optical elements. The light system may include ten or less, eight or less, or six or less optical elements. The optical elements may have a position where the optical elements are complementary (e.g., fit together to form another geometric object) (e.g., in a nominal position). For example, the optical elements may be two triangles that when fitted together form a square or rectangle. The optical elements may have a position where the optical elements are non-symmetrical (e.g., in a writing position). Preferably, the optical elements are a prism. More preferably, the optical elements are two prisms and include a rear prism and a front prism.

The rear prism may function to direct light along an axis, bend light in a first direction, or both. The rear prism may be located proximate to the light source. The rear prism may direct the light in a straight line. The rear prism may bend the light in a first direction. The rear prism may be static. The rear prism may be movable. The rear prism may rotate about an axis (e.g., rotational axis or an axis of the light). The rear prism may be complementary in shape to a forward surface of the light source. The rear prism may have a surface that faces the light source and the surface may diverge away from the light source. The rear prism may have a triangular shape (when viewed from a side). The rear prism may have one or more flat surface, one or more angled faces, or both. The rear prism may be located between a light source and a front prism.

The front prism may function to direct light along an axis, bend light in a first direction, bend light in a second direction, or a combination thereof. The front prism may be located forward of both the light source and the rear prism. The front prism may be a final optical element that the light passes through before exiting a vehicle, a light system, or both. The front prism may be static. The front prism may rotate about an axis, a light, or both. The front prism may have a first position (e.g., nominal position) that directs light in a first direction (e.g., primary light axis). The front prism may have a second position (e.g., a writing position) where the front prism directs light in a second direction (e.g., secondary light axis). The front prism may have one or more flat faces, one or more angled faces or both. The front prism may have a triangular shape when viewed from a side. The front prism may direct light along a primary light axis, a secondary light axis, or both.

The primary light axis functions to illuminate objects in a direction of movement. Preferably, the primary light axis is in front of a vehicle. The primary light axis may be where the light from the optical elements is substantially in line with the rotational axis, the light axis from a light source, or both (e.g., ±2 degrees). The primary light axis may be where the light source is substantially free of bending, redirection, or both relative to the light exiting the light source. For example, the rear prism may bend the light a first time and the front prism may bend the light a second time so that the light is bent back into the original line or axis. The primary light axis may correspond to a center of the light or the center of the light source. The primary light axis may extend parallel to or substantially parallel to a driving surface. The primary light axis may be angled relative to the secondary light axis.

The secondary light axis may function to angle the light towards a driving surface. The secondary light axis may extend at an angle relive to an axis, an axis of the light source, a rotational axis, or a combination thereof. The secondary light axis may extend out away from the vehicle and down onto a road surface. The distance the secondary light axis extends is about 2 m or more, about 3 m or more, or about 4 m or more from the vehicle. The distance the secondary light axis extends is about 10 m or less, about 7 m or less, or about 5 m or less from the vehicle. The secondary light axis may vary depending on the rotational angle of the optical elements, the position of the angled faces, the position of the flat faces, a focal length between the optical elements and the light sources, or a combination thereof. The secondary light axis may be created when the optical elements, the front prism, or both are in a writing mode or writing position. The secondary light axis may be created when the first regions of the front prism and rear prism are coplanar. The secondary light axis may be created when the second regions of the front prism and the rear prism are coplanar.

The first region functions to create a first thickness of the prisms (e.g., rear prism and/or front prism). The first region is a thinnest thickness of the prisms. The first region may be converging sides or faces of the prisms. The first region may be on an end of an angled face as the angled face converges towards a flat face. The first region may be a half of a perimeter or less, a third or a perimeter or less, or a quarter of a perimeter or less of the prisms. The first regions may be opposing in the nominal position. The first regions may be aligned in the writing position. The first region may be located opposite a second region.

The second region functions to create a second thickness of the prisms (e.g., rear prism and/or front prism). The second region may be larger than the first region. The second region may have a thickness of about 1.2 times or more, about 1.3 times or more, about 1.5 times or more, about 1.7 times or more, or about 2 times or more the first region. The second region may have a thickness of about 5 times or less, about 4 times or less, or about 3 times or less the first region. The second region may be diverting faces or sides of the prism. The second region may be on an end of the angled face as the angled face diverges from a flat face. The second region may be a half of a perimeter or less, a third or a perimeter or less, or a quarter of a perimeter or less of the prisms. The second regions may be opposing in the nominal position. The second regions may be aligned in the writing position. The second region and the first region may be connected by an angled face, a flat face, or both.

The flat faces function to extend normal to an axis, a light source, a beam of light, or a combination thereof. The flat faces of the prisms may be parallel to each other. The flat faces may face in a same direction (e.g., both forward or both rearward). The flat faces may face in opposing directions (e.g., one forward and one rearward). The flat faces of the prisms may face each other. The flat faces may be free of bending the light. The flat faces may be located opposite an angled face.

The angled faces function to bend light, direct light, or both. The angled faces may form a complementary shape (e.g., square or rectangle). The angled faces may form a shape that is asymmetrical from top to bottom (e.g., triangle). The angled faces may bend the light down towards a road surface. The angled faces may extend at an angle relative to the flat face. The angle may be about 5 degrees or more, about 7 degrees or more, about 10 degrees or more, or about 12 degrees or more between the angled face and the flat face (e.g., about 15 degrees±2 degrees). The angle may be about 60 degrees or less, about 45 degrees or less, about 30 degrees or less, or about 20 degrees or less between the angled face and the flat face. The position of the angled face relative to the flat face or relative to up and down may vary depending upon a mode or position selected. The position of the angled face may be varied by one or more rotation devices.

The rotation device may function change an orientation of one or more angled faces to direct or re-direct the light from the light source. The rotation device may change the light from near field aiming to far field aiming or vice versa. The rotation device may house the optical elements and move the optical elements. The rotation device may connect the optical elements to the light source. The rotation device may prevent the optical elements from moving along an axis. The rotation device may allow for one or more of the optical elements to rotate about the axis. The rotation device may include a motor. The rotation device may include one or more brackets. The brackets may connect the rotation device to the light source. The rotation device may include one or more holding members that maintain a position of the optical elements (e.g., prisms) within the rotation device.

The holding members function to restrict axial movement, rotational movement, or both of one or all of the optical elements. The holding members may extend around all or a portion of the optical elements. The holding members may contact a periphery of the optical elements. The holding members may contact a portion of a periphery. The holding members may be made of a compliant material, elastic material, plastic, a polymer, a rubber, a keyed piece, or a combination thereof. The holding member may have a portion that extends into a portion of the optical element (e.g., keyed). The holding member may both protect the optical element and maintain a position of the optical element. The holding member may be "U" shaped, "C" shaped, "0" shaped, complementary in shape to the optical element, or a combination thereof. The holding member may be free of moving pieces. The holding member may be placed between a motor, a frame, or both of a rotation device to maintain a position of optical elements (e.g., a front prism, a rear prism, or both). The rotation device may be free of a holding member. The holding member may be located adjacent to one or more rotation members.

The rotation members may function to move one or more of the optical elements between a nominal position and writing position. The rotation members may function to prevent axial movement of the optical elements. The rotation members may permit the optical elements to aim light from the light source. The rotation elements may rotate the optical elements (e.g., prisms) about 15 degrees or more, about 30 degrees or more, about 90 degrees or more, about 115 degrees or more, or about 175 degrees or more (e.g., about 180 degrees). The rotation elements may rotate the optical elements about 360 degrees or less, about 270 degrees or less, about 225 degrees or less, or about 190 degrees or less. The rotation members may include gears. The rotation members may have a portion that extends into a portion of the optical elements. The rotation members may have a high friction surface or may be tacky. The rotation members may be made of or include rubber, an elastomer, grit (e.g., sand), ribs, diamonds, an elevated surface, a smooth surface, metal, keyed pieces, plastic, or a combination thereof. The rotation member may have one or more pieces. The rotation member may include a first piece that extends around a periphery of the optical elements. The rotation member may include a second piece that contacts the first piece and moves the first piece. The rotation member may protect the optical elements. The rotation member may assist in maintaining spacing between the prisms. The rotation device may be connected to a motor. The rotation device may be directly connected to a motor. The rotation device may be indirectly connected to a motor (e.g., through a differential or gear assembly).

The motor may function to move a rotation device. The motor may be an electric motor. The motor may directly drive the rotation members. The motor may indirectly drive the rotation members. The motor may be used to perform a method.

The light system may be adjusted between a nominal mode and a writing mode by a method. The method may move one or more elements of the light system from a nominal position to a writing position. The light system may direct light from a light source through two or more optical elements. The light system may direct light from an exterior of a vehicle. The light system may rotation one or more of the two or more optical elements. The light system may change an aim of the light from a first location to a second location. The light system may change an aim of the light from a near field to a far field. The light system may turn a motor on. The light system may turn a motor off. The light system may activate a rotation member. The rotation device may rotate rotation members. The rotation device may maintain a position or a rotation member. The optical elements may be prisms that may be rotated about an axis. The rotation device, optical elements, or both may be added to a light source, a light system, or both. The rotation device may be added after market to a vehicle. The light source may be varied between a high beam and a low beam. Activating the high beam, the low beam, or both may cause movement of the optical elements.

FIG. 1 illustrates a vehicle 100 including a light system 2 with a light source 10. The light source 10 has a pattern when the light system is in a nominal mode 14 where the light extends at an angle (8) above the ground 80. The light source 10 has a pattern when the light source is in the writing mode 16 where the light extends at an angle (4)) above the ground 80 and some of the light is projected onto the ground 80. As shown, the light in the nominal mode 14 extends higher from the ground 80 than the light in the writing mode 16.

Figure 2A:
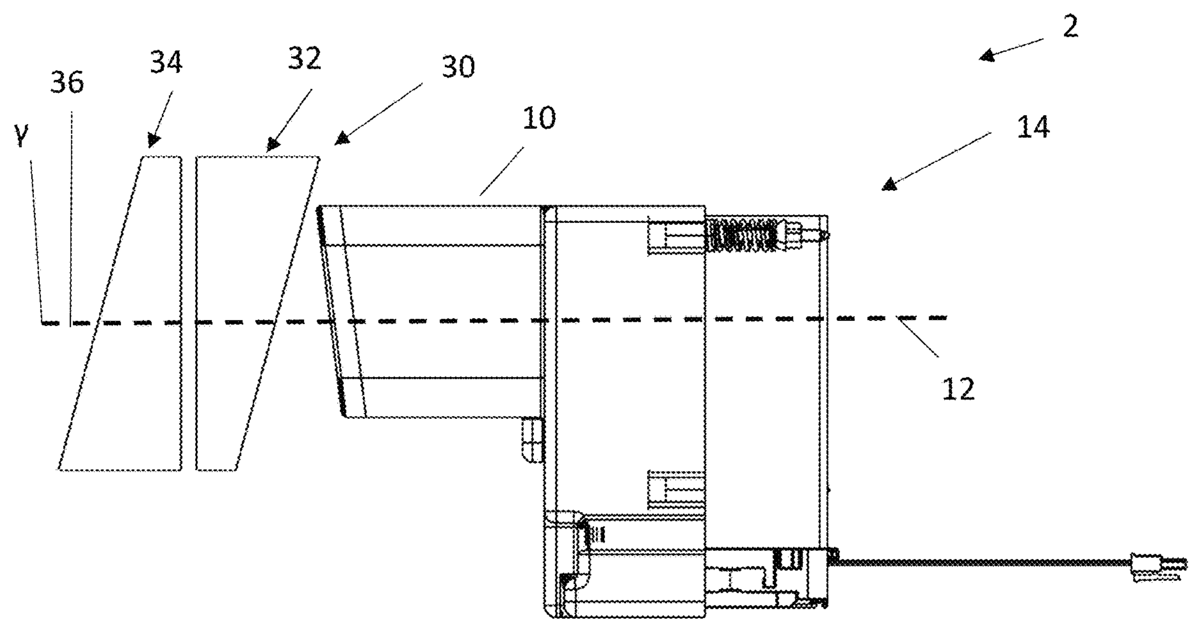
FIG. 2A is a side view of the light system in a nominal mode.

FIG. 2A is a side view of a light system 2 in a nominal mode 14. The light system 2 includes a light source 10 and optical elements 30. The light source 10 projects light along an axis 12 through the optical elements 30. The optical elements 30 include a rear prism 32 and a front prism 34. The light extends through the rear prism 32 and the front prism 34 along a primary light axis 36 that extends at an angle (y) relative to the axis 12.

Figure 2B:
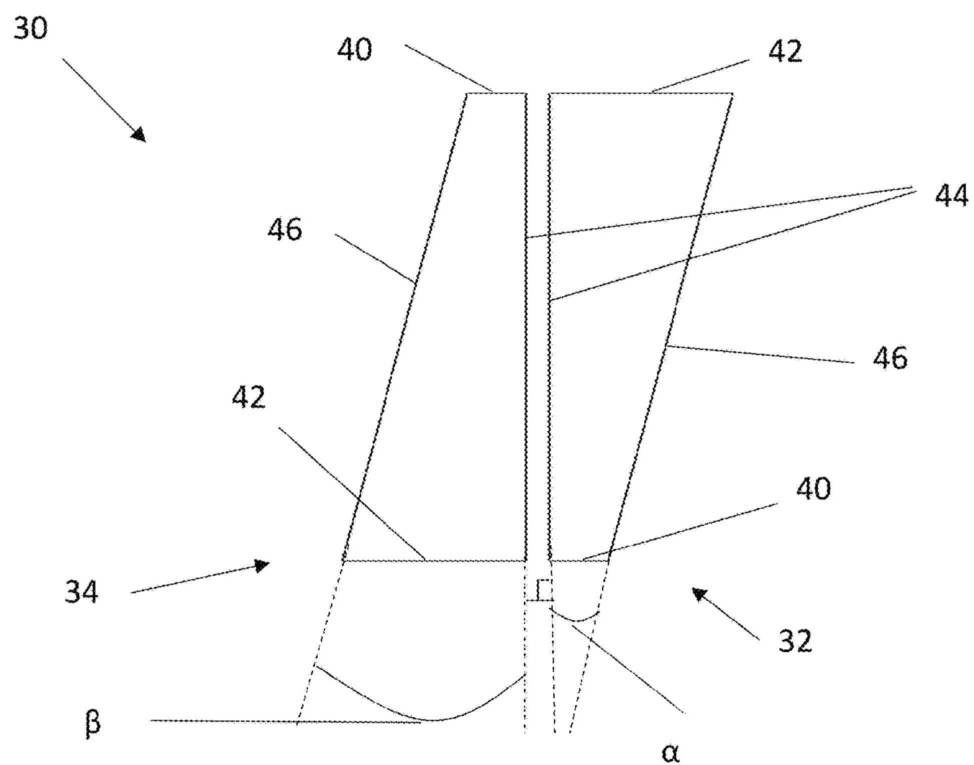
FIG. 2B is a side view of the optical elements of FIG. 2A.

FIG. 2B is a close-up view of the optical elements 30 including the rear prism 32 and the front prism 34. The rear prism 32 has a first region 40 opposing a second region 42 with the second region 42 being larger than the first region 40. The rear prism 32 includes a flat face 44 and an angled face 46 that each extend between and connect the first region 40 to the second region 42. The front prism 34 has a first region 40 opposing a second region 42 with the second region 42 being larger than the first region 40. The front prism 34 includes a flat face 44 and an angled face 46 that each extend between and connect the first region 40 to the second region 42. The first region 40 of the rear prism 32 is coplanar with the second region 42 of the front prism 34 and vice versa as shown. The flat faces 44 of the rear prism 32 and the front prism 34 are located proximate to each other and extend parallel to another. The flat face 44 and the angled face 46 of the rear prism 32 form an angle (a). The flat face 44 and the angled face 46 of the front prism 34 form an angle (β).

Figure 3:
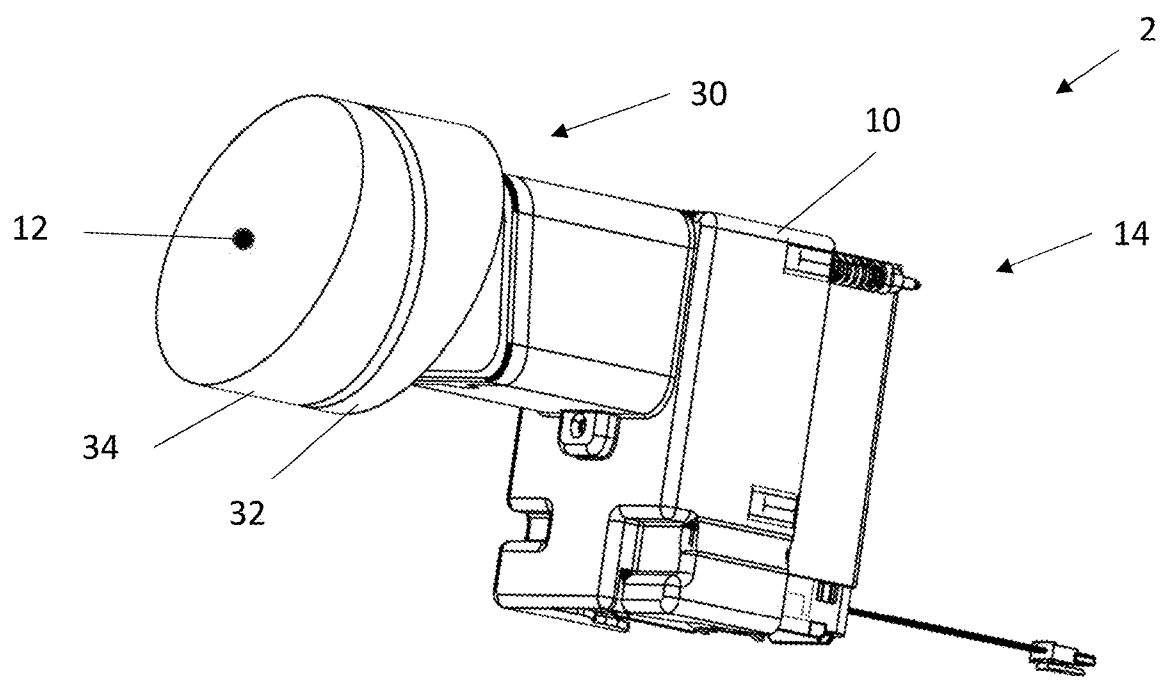
FIG. 3 is a front perspective view of the light system in the nominal mode.

FIG. 3 is a front perspective view of the light system 2 in a nominal mode 14. The light system 2 includes a light source 10 that directs light (not shown) through optical elements 30 along an axis 12. The optical elements 30 include a rear prism 32 and a front prism 34.

Figure 4:
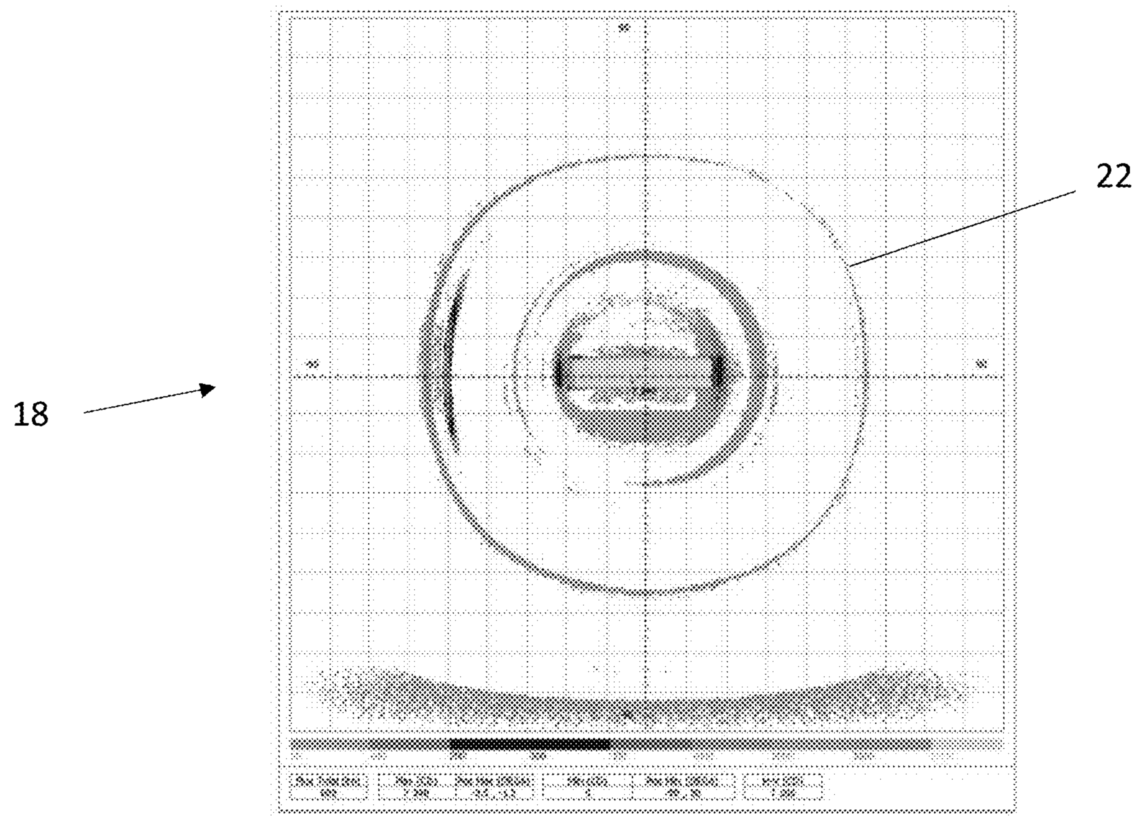
FIG. 4 is a plan view of a beam pattern in the nominal mode.

FIG. 4 illustrates the beam pattern of the light 22 when the light source (not shown) is in the nominal position 18.

Figure 5A:
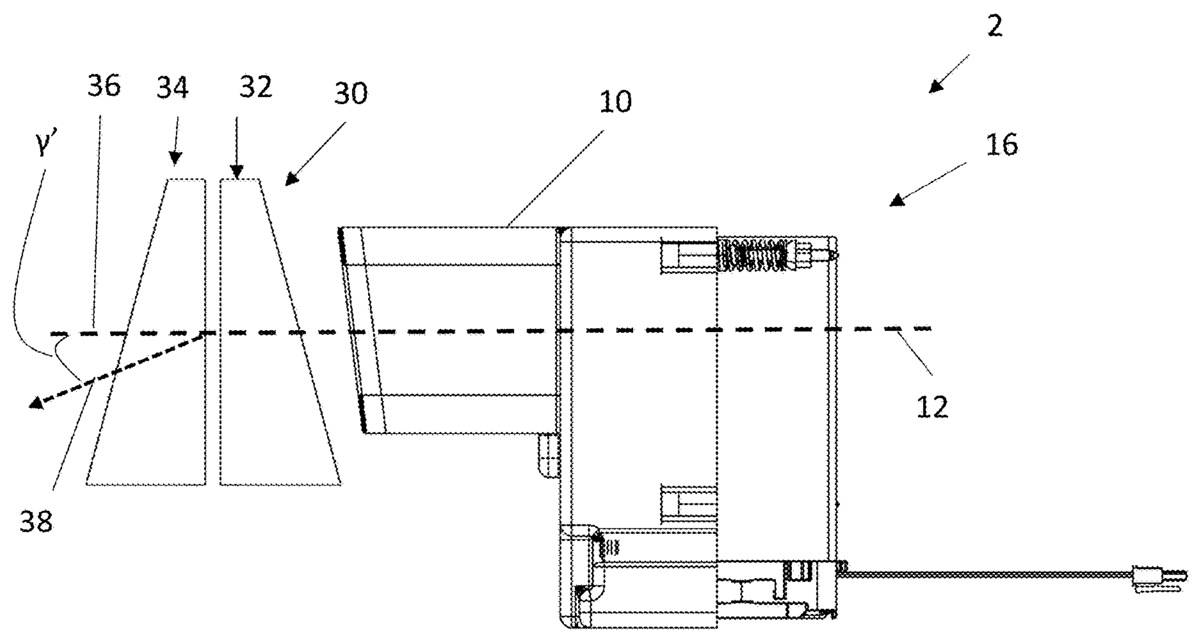
FIG. 5A is a side view of the light system in the writing mode.

FIG. 5A is a side view of a light system 2 in a writing mode 16. The light system 2 includes a light source 10 and optical elements 30. The light source 10 projects light along an axis 12 through the optical elements 30. The optical elements 30 include a rear prism 32 and a front prism 34. The light extends through the rear prism 32 generally along axis 12 and then the front prism 34 generally along a secondary light axis 38 that extends at an angle (y') relative to the axis 12 and the primary light axis 36. The primary light axis 36 and secondary light axis 38 are depicted as a single line; however, the light will extend through a larger area of the optical elements 30, which has not been depicted.

Figure 5B:
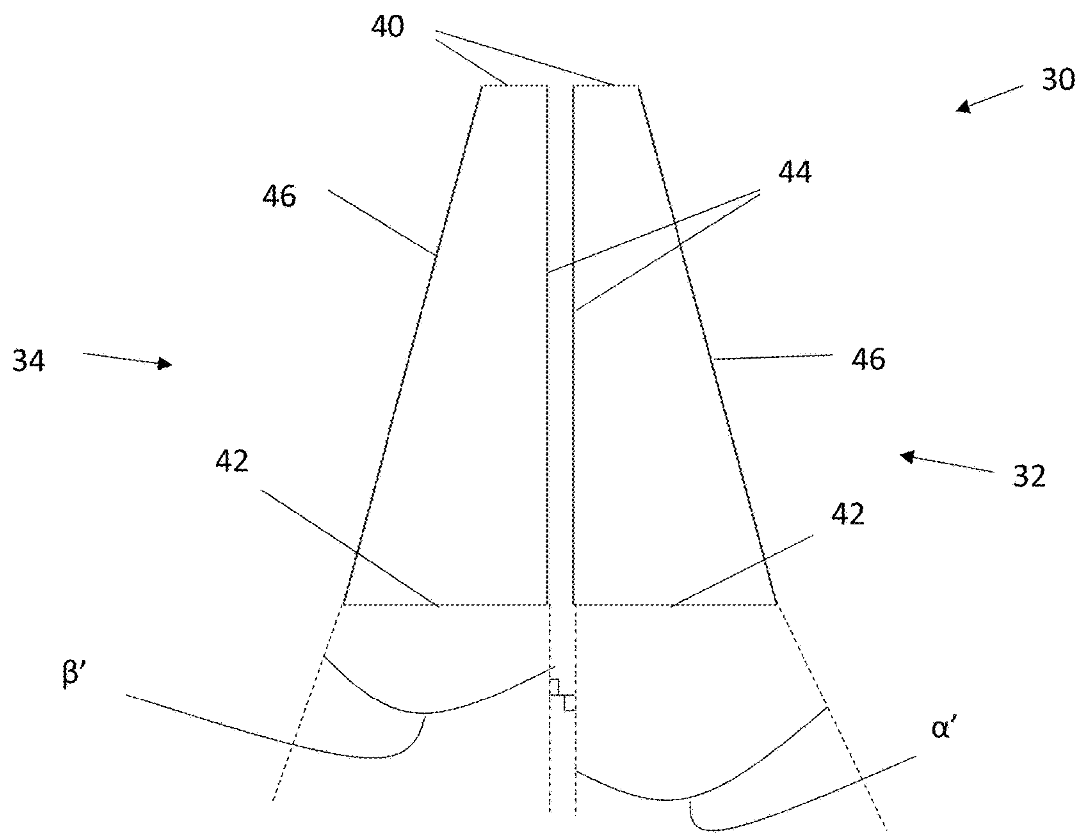
FIG. 5B is a side view of the optical elements of FIG. 5A.

FIG. 5B is a close-up view of the optical elements 30 including the rear prism 32 and the front prism 34. The rear prism 32 has a first region 40 opposing a second region 42 with the second region 42 being larger than the first region 40. The rear prism 32 includes a flat face 44 and an angled face 46 that each extend between and connect the first region 40 to the second region 42. The front prism 34 has a first region 40 opposing a second region 42 with the second region 42 being larger than the first region 40. The front prism 34 includes a flat face 44 and an angled face 46 that each extend between and connect the first region 40 to the second region 42. The first region 40 of the rear prism 32 is coplanar with the first region 40 of the front prism 34 and vice versa as shown, and the second region 42 of the rear prism 32 is coplanar with the second region 42 of the front prism 34. The flat faces 44 of the rear prism 32 and the front prism 34 are located proximate to each other and extend parallel to another. The flat face 44 and the angled face 46 of the rear prism 32 form an angle (α'). The flat face 44 and the angled face 46 of the front prism 34 form an angle (β').

Figure 6:
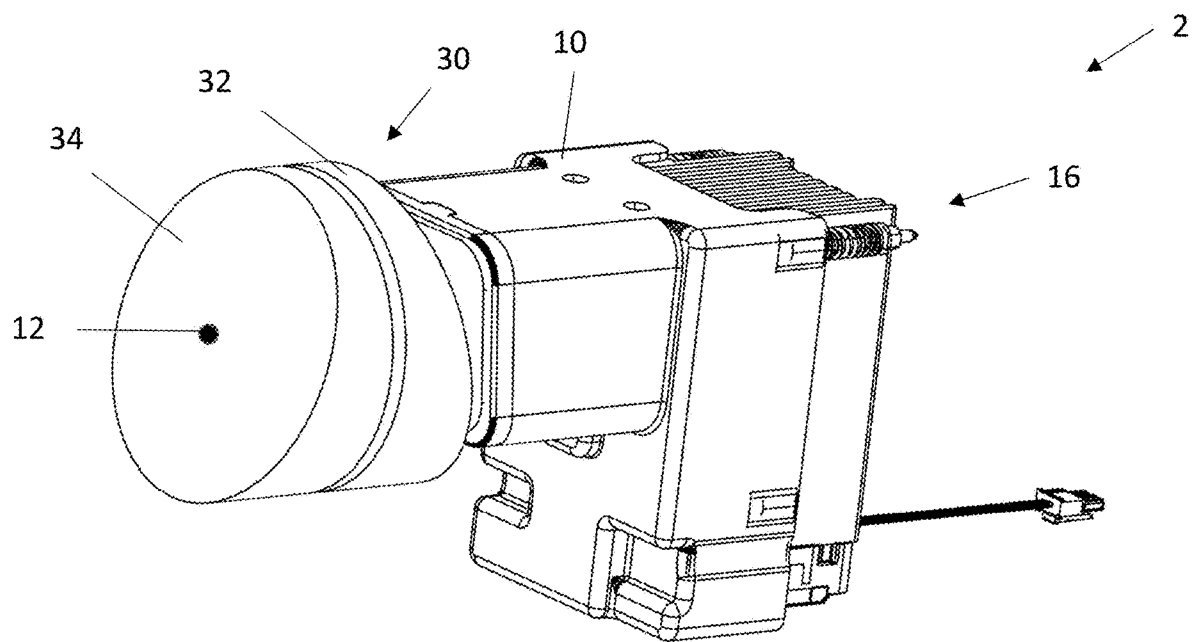
FIG. 6 is a front perspective view of the light system in the writing mode.

FIG. 6 is a front perspective view of the light system 2 in a writing mode 16. The light system 2 includes a light source 10 that directs light through optical elements 30 at least partially along axis 12. The optical elements 30 include a rear prism 32 and a front prism 34.

Figure 7:
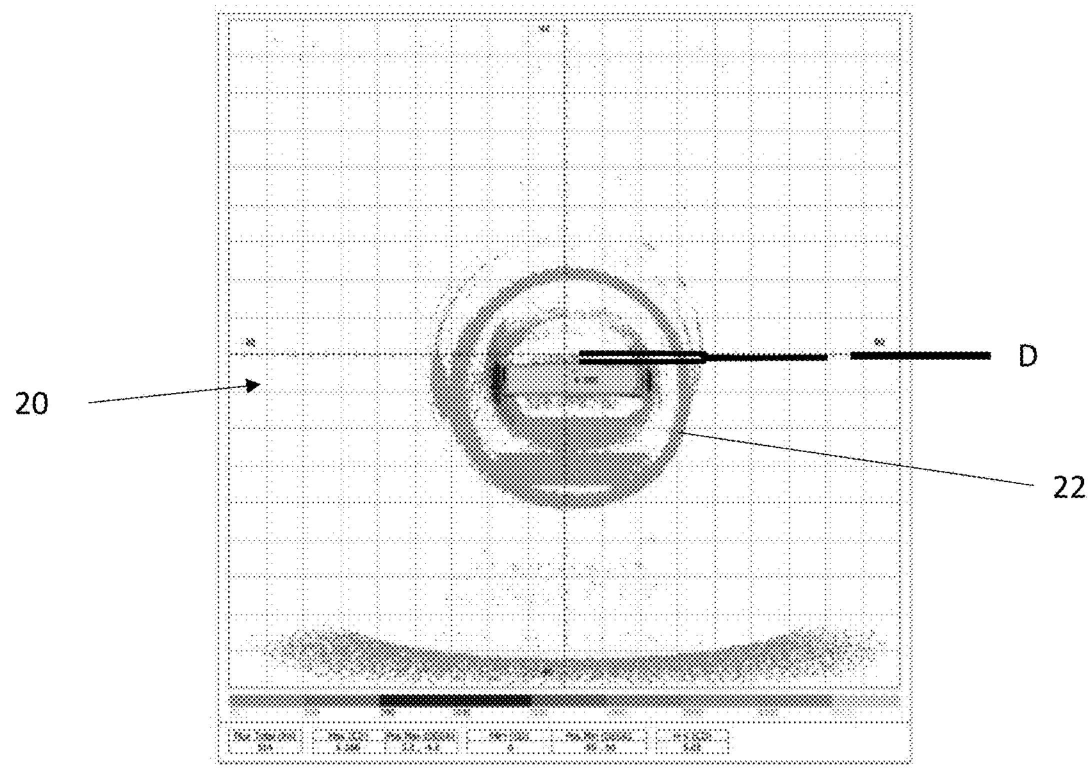
FIG. 7 is a plan view of a beam pattern in the writing mode.

FIG. 7 illustrates the beam pattern of the light 22 when the light source (not shown) is in the writing position 20. In the writing position 20 the light 22 moves a distance (D) relative to the nominal position shown in FIG. 4.

Figure 8:
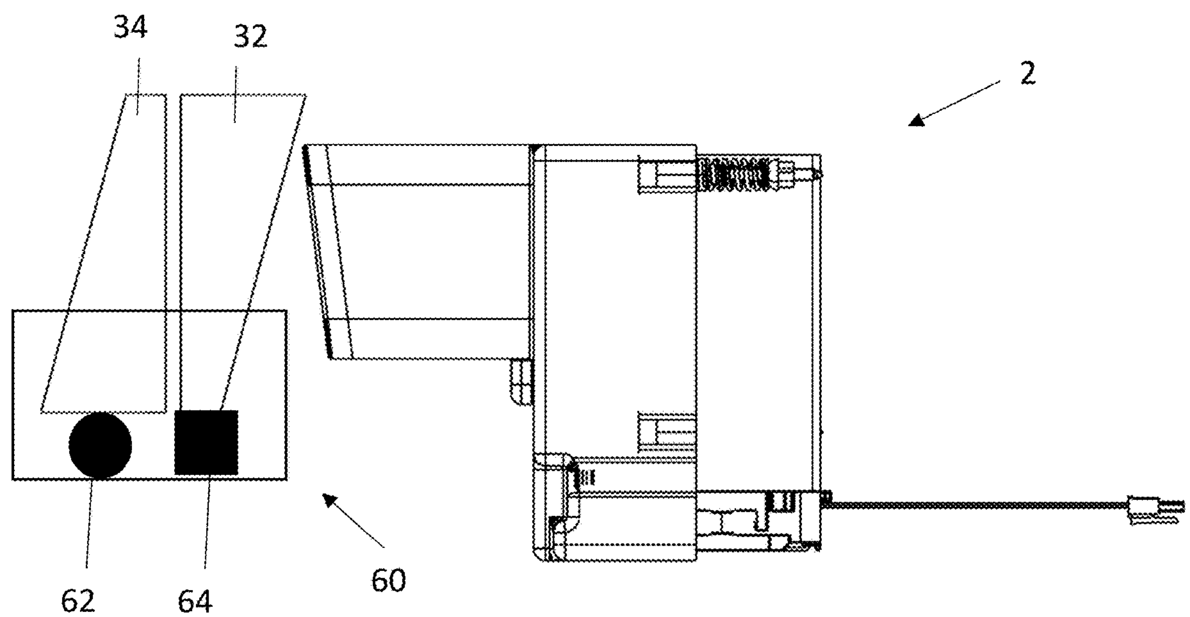
FIG. 8 is a side view of a light system including a rotation device.

FIG. 8 is a side view of a light system 2 including a rotation device 60. The rotation device 60 includes a rotation member 62 in communication with a front prism 34 that rotates the front prism 34 between positions. The rotation device 60 includes a holding member 64 that maintains a position of the rear prism 32 and prevents movement of the rear prism 32.

Figure 9:
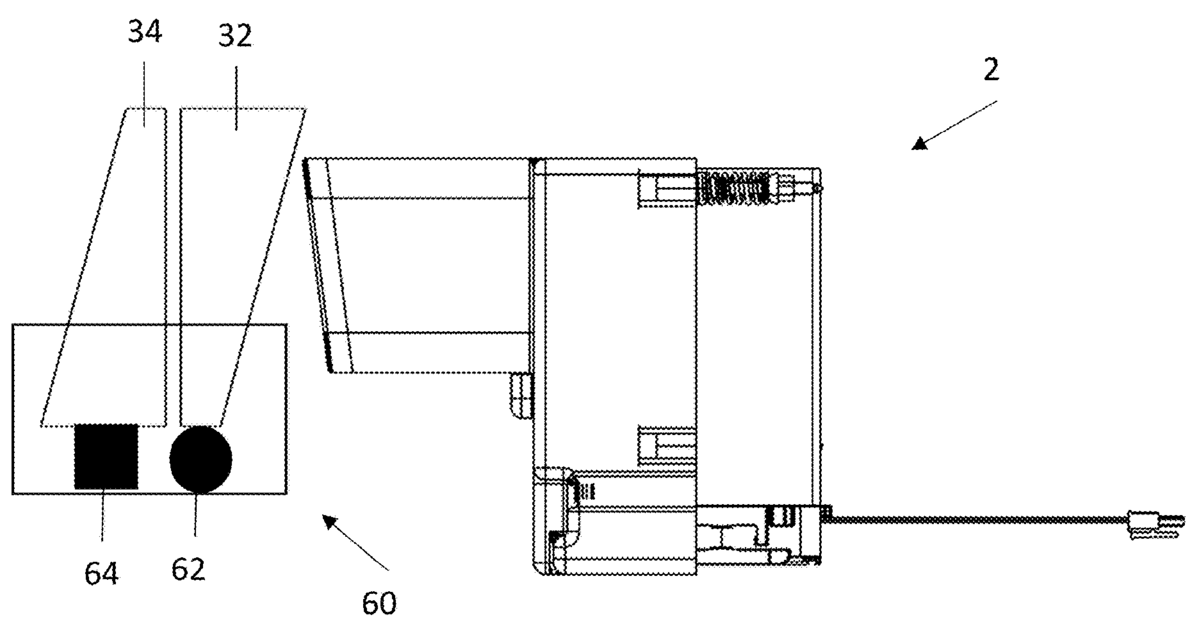
FIG. 9 is a side view of a light system including a rotation device.

FIG. 9 is a side view of a light system 2 including a rotation device 60. The rotation device 60 includes a rotation member 62 in communication with a rear prism 32 that rotates the rear prism 32 between positions. The rotation device 60 includes a holding member 64 that maintains a position of the front prism 34 and prevents movement of the front prism 34.

Figure 10:
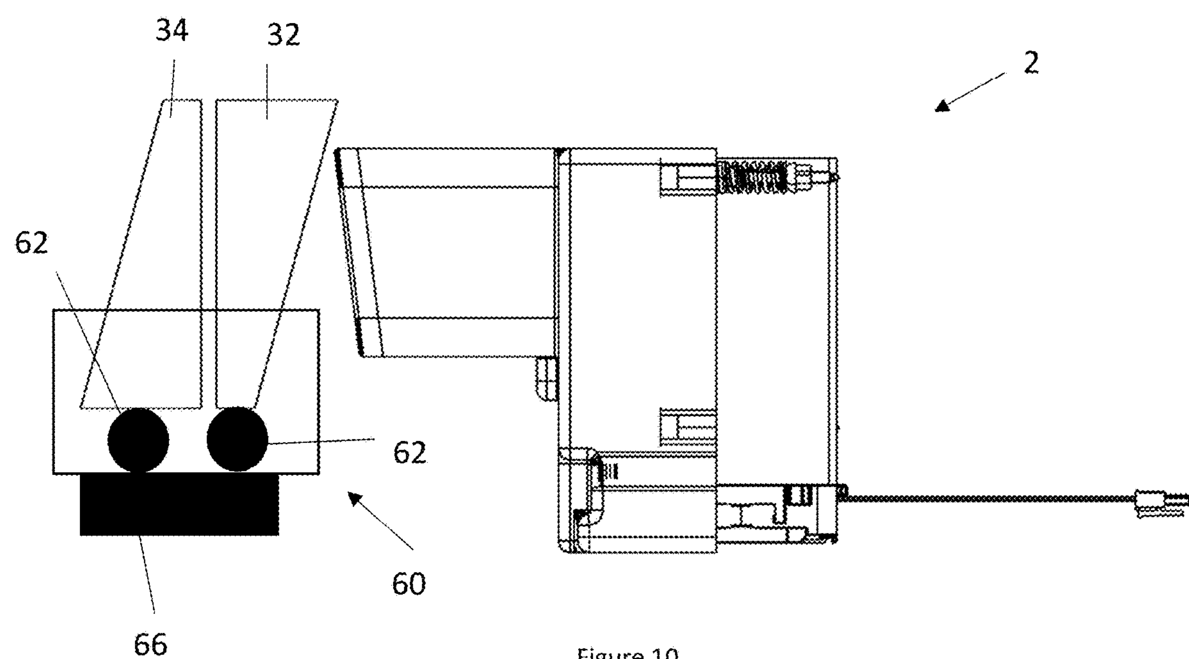
FIG. 10 is a side view of a light system including a rotation device.

FIG. 10 is a side view of a light system 2 including a rotation device 60. The rotation device 60 includes two rotation members 62 so that both the rear prism 32 and the front prism 34 are rotatable about an axis (not shown) to adjust an angle of the beam of light (not shown) exiting the light system 2. The two rotation members 62 are moved by a motor 66.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Light System
10 Light Source
12 Axis
14 Nominal Mode
16 Writing Mode
18 Nominal Position
20 Writing Position
22 Light
30 Optical Elements
32 Rear Prism
34 Front Prism
36 Primary Light Axis
38 Secondary Light Axis
40 First Region
42 Second Region
44 Flat Face
46 Angled Face
60 Rotation Device
62 Rotation Member
64 Holding Member
66 Motor
80 Ground
100 Vehicle
D Distance Moved

We claim:

1. A light system comprising:

a. a light source that is configured to direct light from an exterior of a vehicle; and b. two or more optical elements that direct the light to two or more desired locations without movement of the light source, the two or more optical elements being in series so that the light from the light source is through the two or more optical elements, each of the two or more optical elements comprising:

a flat face, and an angled face that is angled relative to the flat face and is located opposite the flat face, wherein the flat face of a first of the two or more optical elements is parallel to and faces the flat face of a second of the two or more optical elements; and wherein the two or more desired locations include directing the light towards a driving surface when the two or more optical elements are in a writing mode and directing the light to a location above the driving surface when the two or more optical elements are in a nominal mode; and wherein the light system in the writing mode creates images on the driving surface and the images include a combination of words, shapes, numbers, and patterns, and the light system in the nominal mode is a high beam or a low beam.

2. The light system of claim 1, wherein the two or more optical elements are two or more prisms.

3. The light system of claim 2, wherein the prisms have a substantially triangular cross-sectional shape.

4. The light system of claim 3, wherein the two or more prisms each have a first region and a second region with the first region being smaller than the second region.

5. The light system of claim 4, wherein the first region of one of the two or more prisms is aligned with a second region of a second of the two or more prisms when the two or more prisms are in the nominal mode, and the first region of the two or more prisms is aligned with a first region of a second of the two or more prisms when the two or more prisms are in the writing mode.

6. The light system of claim 1, wherein a first end of the first of the two or more prisms is coplanar with a first end of the second of the one or more prisms when the light system is in the nominal mode.

7. The light system of claim 1, wherein the light directed towards the location above the driving surface extends substantially parallel to the driving surface.

8. The light system of claim 1, wherein one or more of the two or more optical elements are rotatable about a rotational axis by a rotational device that rotates the one or more of the two or more optical elements about the rotational axis to change the light between the two or more desired locations.

9. The light system of claim 1, wherein an angle of the light changes by about 5 degrees or more when the light is changed between the driving surface and a location above the driving surface.

10. The light system of claim 1, wherein the light source selectively turns on and off a portion of the light source so that one or more images are formed on the driving surface.

11. The light system of claim 10, wherein the light source includes a plurality of light emitting diodes (LEDs) and the LEDs are selectively turned on or off to form the one or more images on the driving surface.

12. The light system of claim 1, wherein the light source is free of movement when the light is changed between the driving surface and the location above the driving surface.

13. The light system of claim 12, wherein the light source is a headlight of the vehicle.

14. The light system of claim 1, wherein the light system includes a rotation device that rotates the first of the two or more optical elements and holds static the second of the two or more optical elements.

15. A method comprising:

a) directing light from a light source through two or more optical elements so that the light extends outward from an exterior of a vehicle, wherein each of the two or more optical elements comprise:
   i) a flat face, and
   ii) an angled face that is angled relative to the flat face and is located opposite the flat face, wherein the flat face of a first of the two or more optical elements is parallel to and faces the flat face of a second of the two or more optical elements; and b) rotating one or more of the two or more optical elements about an axis so that the light direction is changed between a first location and a second location, wherein the first location is a location above or parallel to a driving surface when the light is in a nominal mode and the second location is a location is the driving surface when the light is in a writing mode; and c) changing between the writing mode where light is directed towards the driving surface to produce images that include a combination of words, shapes, numbers, and patterns, and the nominal mode where a high beam and a low beam is directed above the driving surface.

16. The method of claim 15, wherein the light source is free of movement to direct the light to the first location and the second location.

17. The method of claim 15, wherein the light source is a single light source and the light from the light source is directed between the first location and the second location.

18. The method of claim 15, wherein an angle of the light in the first location and the second location changes by about 5 degrees or more.

19. The method of claim 15, wherein the light source is a headlight of a vehicle including a plurality of light emitting diodes (LEDs), and the method includes a step of selectively turning on or off one or more of the LEDs to form the one or more images on the driving surface.

20. The method of claim 15, wherein the second of the two or more optical elements is located between the light source and the first of the two or more optical elements, and the method includes a step of rotating the first of the two or more optical elements and holding the second of the two or more optical elements in a static state.

* * * * *